(12) United States Patent
Fukumoto et al.

(10) Patent No.: US 6,393,767 B1
(45) Date of Patent: May 28, 2002

(54) VEHICLE DOOR SYSTEM HAVING A DOOR LOCK DEVICE AND DOOR OUTSIDE HANDLE WITH AN IMPROVED WATER-PROOFING STRUCTURE

(75) Inventors: Ryoichi Fukumoto, Nagoya; Tetsuro Tanimoto, Anjo; Masayuki Uchitsunemi, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/556,332

(22) Filed: Apr. 24, 2000

(30) Foreign Application Priority Data

Apr. 22, 1999 (JP) .......................................... 11-115221

(51) Int. Cl.[7] .............................................. E06B 3/00
(52) U.S. Cl. ........................................................ 49/503
(58) Field of Search ................ 49/502, 503; 296/146.5, 296/146.7; 70/237, 264, 370

(56) References Cited

U.S. PATENT DOCUMENTS

| | | | | |
|---|---|---|---|---|
| 4,956,943 A | * | 9/1990 | Yamada et al. ............... | 49/503 |
| 5,095,659 A | * | 3/1992 | Benoit et al. ............... | 49/503 X |
| 5,224,364 A | * | 7/1993 | Claar et al. ................... | 70/237 |
| 5,316,364 A | * | 5/1994 | Ohya ........................ | 296/146.5 |
| 5,902,004 A | * | 5/1999 | Waltz et al. ............... | 49/503 X |
| 5,904,002 A | * | 5/1999 | Emerling et al. .......... | 49/503 X |

FOREIGN PATENT DOCUMENTS

| | | |
|---|---|---|
| JP | 4-16276 | 2/1992 |
| JP | 5-201252 | 8/1993 |

* cited by examiner

*Primary Examiner*—Jerry Redman
(74) *Attorney, Agent, or Firm*—Burns, Doane, Swecker, Mathis, LLP (57) ABSTRACT

A vehicle door system includes a door inner panel interconnected to a door outer panel to form an outer space therebetween. The inner panel includes a sealed through-hole interconnecting the outer space with an inner space situated on an opposite (inner) side of the inner panel. A door lock device is disposed in the inner space and is operable to open and close the door. A door outside handle is attached to the door outer panel and is operatively connected to the door lock device by a connecting structure which extends through the through-hole. A hood element is secured to the inner panel and situated in the outer space for covering the through-hole to prevent moisture and other external substances from reaching the through-hole.

5 Claims, 10 Drawing Sheets

VEHICLE DOOR SYSTEM HAVING A DOOR LOCK DEVICE AND DOOR OUTSIDE HANDLE WITH AN IMPROVED WATER-PROOFING STRUCTURE

BACKGROUND OF THE INVENTION

1. Field of the Invention

This invention relates to a door system for a vehicle having a door lock device and a door outside handle operatively interconnected by a connecting element.

2. Description of the Related Arts

Conventionally, a door system for a vehicle of this type is disclosed in a Japanese Utility publication Jitu Kai hei 4-16276 published in 1992, the disclosure of which is incorporated herein by reference.

In this prior art, the door system includes a door inner panel and a door outer panel connected one another to form a door space therebetween. A door lock device includes a door-opening element attached on the inner surface (i.e., compartment-facing surface) of the door inner panel. A door outside handle is operatively connected to the door-opening element of the door lock device by a connecting element and is attached on an outer surface of the door outer panel, i.e., a surface facing away from the passenger compartment.

This door system further includes a through-hole formed in the door inner panel, and the connecting element extends through the through-hole via a sealing element. One end of the connecting element is connected to the opening element of the door lock device and the other end thereof is connected to the door outside handle to establish an operative connection between the door lock device and the door outside handle.

Thus, in that type of conventional door system, a through-hole is formed in the door inner panel for accommodating the connecting element to facilitate the operative connection between the door lock device and the door outside handle. In order to seal or cover the through-hole, a sealing member is provided. Further, a space disposed to the outer side of the inner panel is exposed to the vehicle exterior, at an upper edge of that space (at the belt line portion of the vehicle door). That exposure is due to the presence of a gap between the door inner panel and the door outer panel to accommodate passage of a window glass being raised or lowered. This exposure may cause water or rain drops to enter the space. Such external substances entering the space may directly contact the sealing member, and may eventually lead to corrosion thereof and finally to a destruction of the waterproofing function thereof.

SUMMARY OF THE INVENTION

It is therefore an object of the present invention to provide an improved door system for a vehicle having an improved water proofing function with a water prevention structure.

It is another object of the present invention to provide an improved vehicle door having a door lock device and a door outside handle incorporated into the door.

It is a further object of the present invention to provide an improved vehicle door having a door lock device and a door outside handle which can obviate the above conventional drawbacks.

It is still a further object of the present invention to provide an improved vehicle door having a door lock device and a door outside handle, wherein water is prevented from entering an inner space of the vehicle compartment through the door inner panel.

It is still a further object of the present invention to provide an improved vehicle door having a door lock device which can improve the vehicle theft prevention function.

In order to solve the above technical problems, a vehicle door system having a door lock device and a door outside handle includes a through-hole formed in a door inner panel and through which extends either the door-opening element of the door lock device or the connecting element, and a hood element provided in the door outer space for sealing or covering the through-hole.

According to the technical solution above, the water proofing function may be drastically improved by protecting the through-hole and seal from direct exposure to the water or water drops entering the door outer space by using the hood element to cover the through-hole.

More preferably, the door-opening element of the door lock device has a reverse U-shaped lever inserted through the through-hole. One end of the lever extends into the door outer space and is connected to the connecting element, and the other end of which extends into the door inner space. A main lever rotatably connected to the other end of the door-opening element serves for actuating the door lock device. A sub lever has one end rotatably connecting the door-opening element with the other end of the open lever, and another end rotatably connected to a base plate of the door lock device. Linear movement of the connecting element in response to a door-opening operation of the door outside handle is converted into rotational movement, and such rotational movement is transmitted to the door lock device.

According to the present invention, a water proof material is preferably provided on the outer peripheral portion of through-hole to improve the water proofing function.

According to another preferred aspect of the invention, the hood element may be constructed as a lock reinforcement to reinforce the portion of the door inner panel corresponding to the attachment portion of the door lock device.

According to the vehicle door system of the above structure of the invention, since the door lock device is disposed on the inner side of the door inner panel, the vehicle theft prevention function will be improved.

BRIEF DESCRIPTION OF THE DRAWINGS

These and other objects and features of the invention will be more apparent and more readily appreciated from the following detailed description of preferred embodiments of the invention with the accompanying drawings, in which.

DETAILED DESCRIPTION OF PREFERRED EMBODIMENTS OF THE INVENTION

As will become apparent, a key feature of this invention involves a member 22 (FIG. 6) which functions to reinforce a door lock device, as well as functioning as a cover to prevent water, etc., from contacting a grommet 33 that creates a seal around a through-hole 5b. That feature will be understood following a description of the overall door structure.

Figure 1:
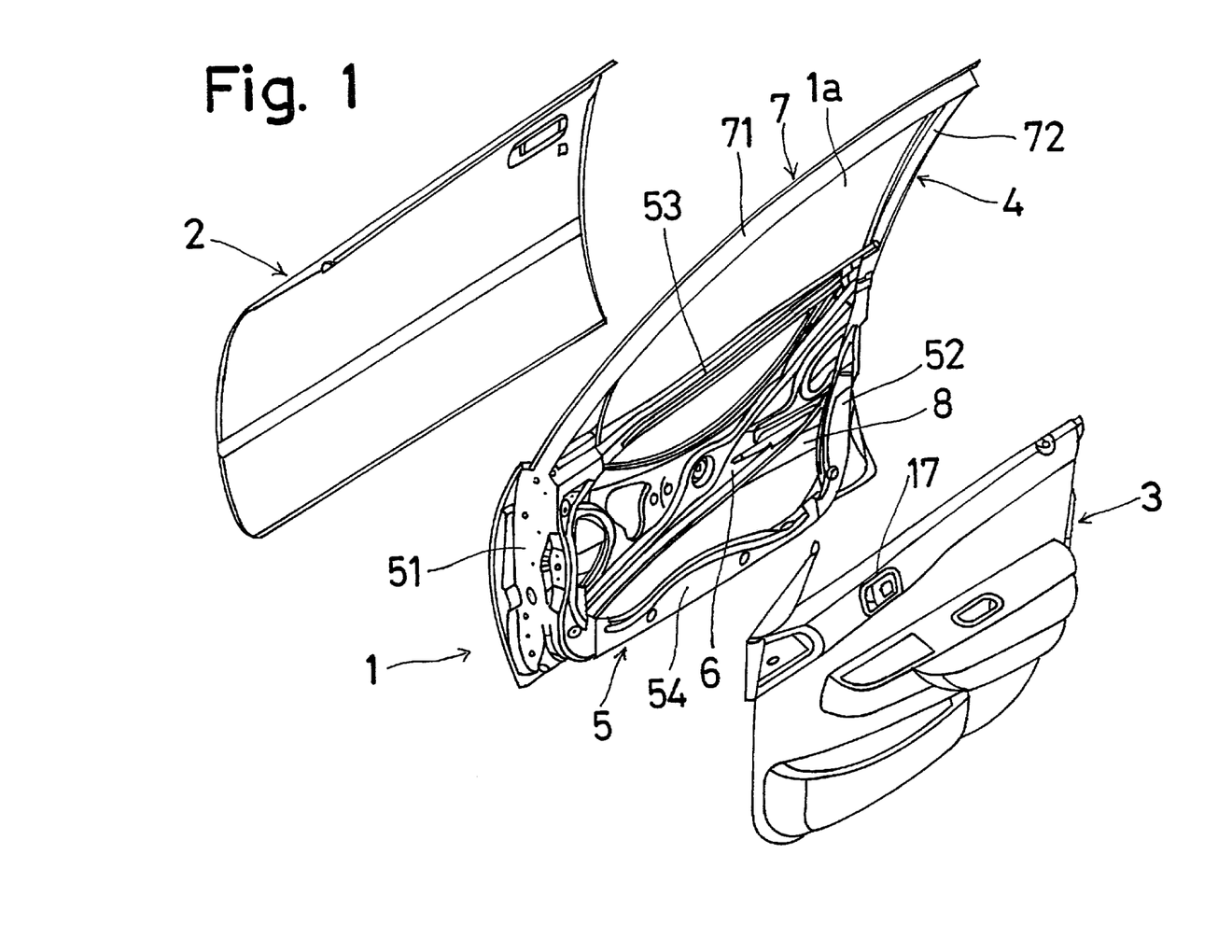
FIG. 1 is an exploded perspective view of a vehicle door according to the present invention.

Referring now to the attached drawings, first in FIG. 1, the door 1 of the vehicle is comprised of: a door outer panel 2 which defines the vehicle door outside appearance, a door trim 3 which defines the vehicle door inside appearance, and an inner door module 4 which serves as a door frame of the door 1. The inner door module 4 is disposed between the door outer panel 2 and the door trim 3 and supports the door trim 3 on the inner surface of the inner door module (i.e., the surface facing the passenger compartment), and further supports the door outer panel 2 on the outer surface side of the inner module 4 (i.e., the surface facing away from the passenger compartment).

Figure 2:
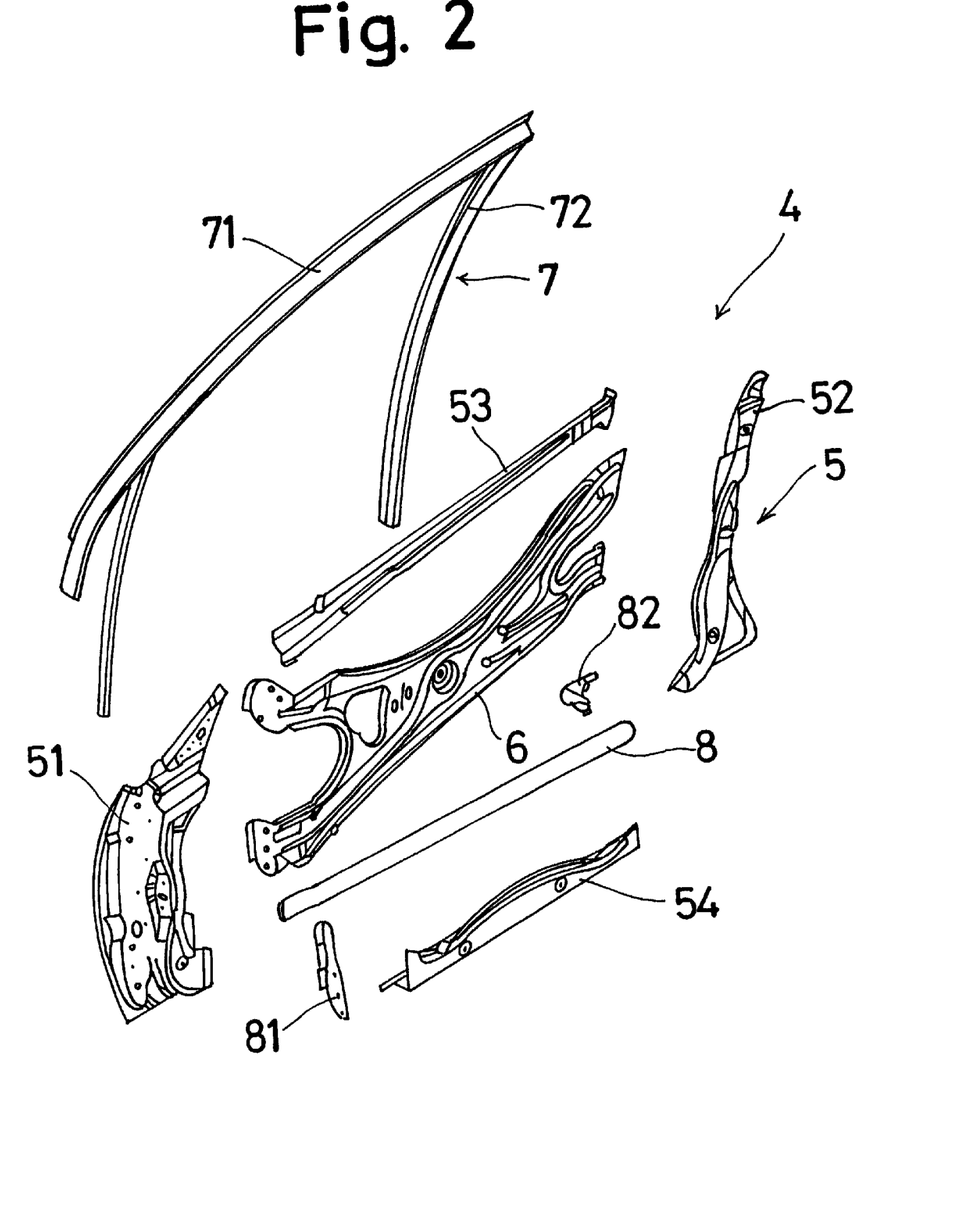
FIG. 2 is an exploded perspective view of the inner module of the vehicle door according to the invention.

As shown in FIG. 2, the inner module 4 includes a door inner panel 5, a base panel 6, a door frame 7 and a door impact beam 8.

The door inner panel 5 includes a hinge side panel 51, a lock side panel 52, an upper reinforcement 53 and a lower panel 54. The hinge side panel 51 is provided along the forward end (left side as shown in FIG. 1) of the door outer panel 2 and serves as a front end wall of the vehicle door 1. The lock side panel 52 is provided along the rear end (right side as shown in FIG. 1) of the door outer panel 2 and serves as a rear end wall of the vehicle door 1.

The upper reinforcement 53 is provided along the upper end (belt molding line) of the door outer panel 2. The front end of the reinforcement is welded to the hinge side panel 51, and the rear end of the reinforcement is welded to the lock side panel 52. The lower panel 54 is provided along the lower end of the door outer panel 2 and has a front end welded to the hinge side panel 51, and a rear end welded to the lock side panel 52. Thus, the door inner panel 5 is shaped as a rectangular frame to form a framework for the vehicle door. The front and rear edges and the lower edge of the door outer panel 2 are secured to the door inner panel 5 by a roll-forming hemming operation to form therebetween a door outer space A (see FIG. 7) which is open at the upper belt line with the cooperation of the door outer panel 2. A door inner space B is formed between the panel 5 and the trim 3.

Figure 3:
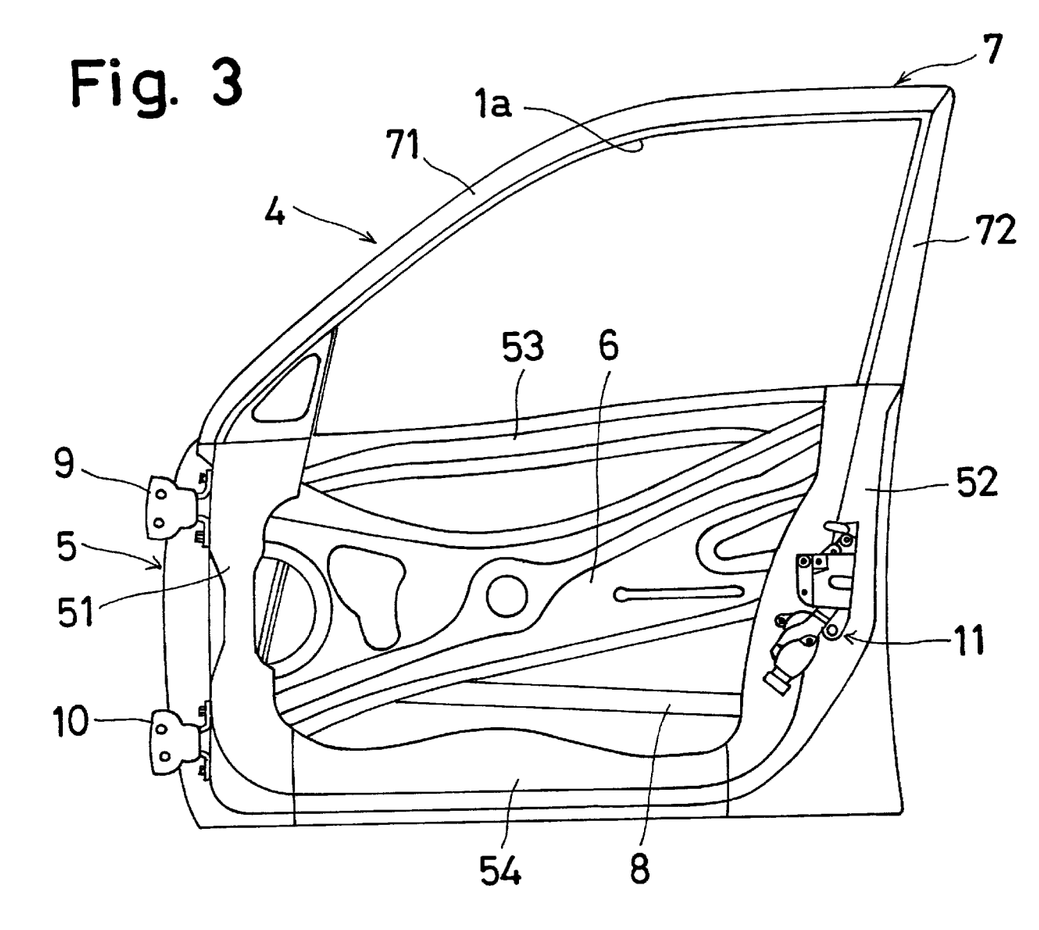
FIG. 3 is a front view of the inner module of the vehicle door according to FIG. 2.

The door outer space A accommodates a door window glass held on both of its sides by the belt molding 41. The window glass is raised and lowered within a window portion 1a formed by the door frame 7. (See FIG. 3).

A pair of upper and lower hinge elements 9, 10 (see FIG. 3) which swingably support the front end of the door 1 with respect to the vehicle body are attached to the hinge side panel 51. The door lock device 11 is attached to the lock side panel 52 positioned at the rear portion of the door 1 and detachably supports the rear edge of the vehicle door 1 with respect to the vehicle body 12 (see FIG. 7).

Thus constructed, the vehicle door 1 is swingably supported to the vehicle body 12 to be swung open or closed.

The base panel 6 is X-shaped and welded to the hinge side and lock side panels 51 and 52. The base panel 6 is provided in parallel with the door outer panel 2 to provide reinforcement against the twisting force of the vehicle door The door frame 7 forms the window portion 1a in the vehicle door 1 and includes a front roof pillar element 71 which has a closed cross sectional shape and a center pillar element 72 which has a closed cross sectional shape welded together to form a framework of the door 1. The edge portion of the front roof pillar element 71 is welded to the hinge side panel 51, whereas the edge portion of the center pillar element 72 is welded to the lock side panel 52.

The door impact beam 8 is of elongated pipe shape and is disposed within the door outer space A at the outer side of the base plate 6 and in parallel with the upper reinforcement 53 and the lower panel 54. The ends of the beam 8 are connected to the hinge side panel 51 and the lock side panel 52 through brackets 81 and 82, respectively. It is noted that the base panel 6 and the door impact beam 8 are covered by a cover member 24 attached to the inner side surface of the door inner panel 5 by a seal member 23. (See FIG. 7).

Figure 7:
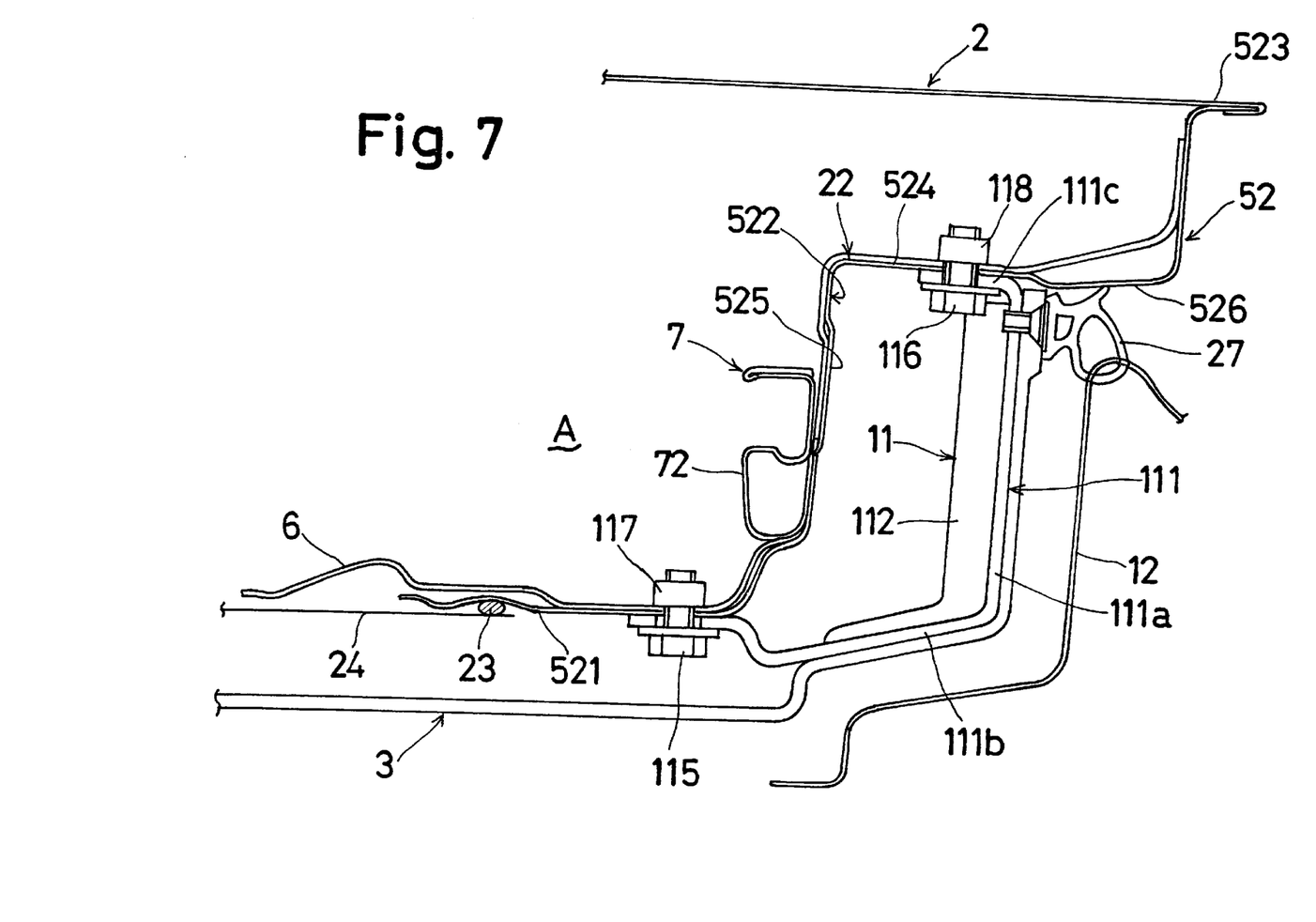
FIG. 7 is a cross-sectional view taken along the line C—C of FIG. 5.

Next, explaining the structure of the door lock device 11, the lock side panel 52 of the door inner panel 5 is of a reverse L-shape having a first wall 521 and a second wall 522 as shown in FIG. 7. The first wall 521 is disposed at the inner side of the door outer panel 2 at a predetermined distance from the door outer panel 2, with the first wall 521 and the door outer panel 2 being in parallel relation with each other.

The rear edge of the second wall 522 is bent to form a flange wall 523 extending from the second wall 522 in an opposite direction to the first wall 521. A recess 525 is formed between the second wall 522 and a third wall 524 that extends approximately in parallel with the first wall 521. The recess 525 is disposed at the approximately central portion of the door in the vehicle width direction between the panel 2 and the trim 3.

The door lock device 11 is attached to a base plate 111 the cross section of which is of approximately reverse-C shape formed by a pair of flange walls 111b and 111c extending from both ends of a main wall 111a. The door lock device 11 includes a latch structure 112 at the inside thereof (see FIG. 8). The latch structure 112 is the type which engages with and disengages from a striker (not shown) secured to the vehicle door.

Figure 5:
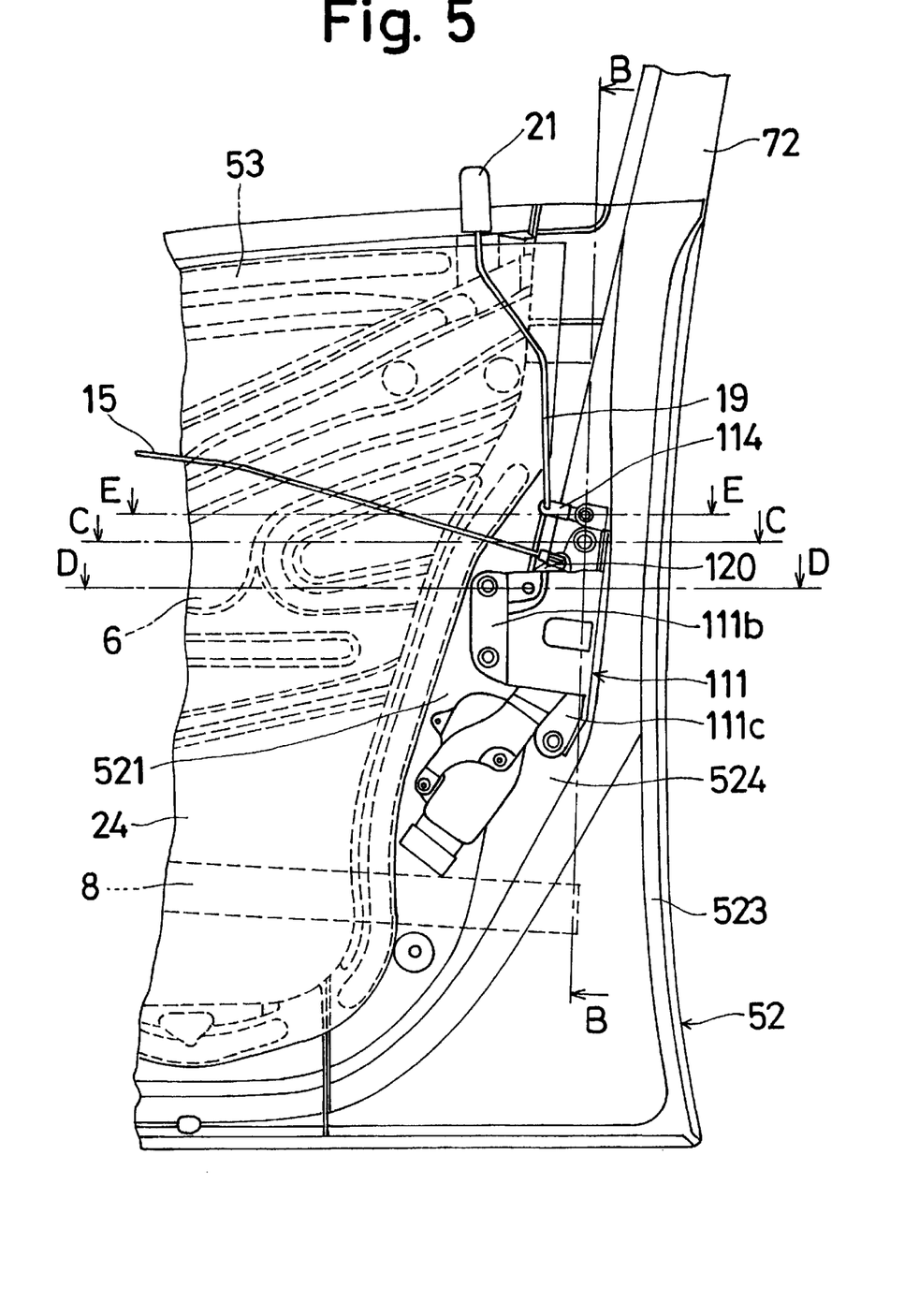
FIG. 5 is a front view of the door lock device attached to the vehicle door of the present invention.
Figure 6:
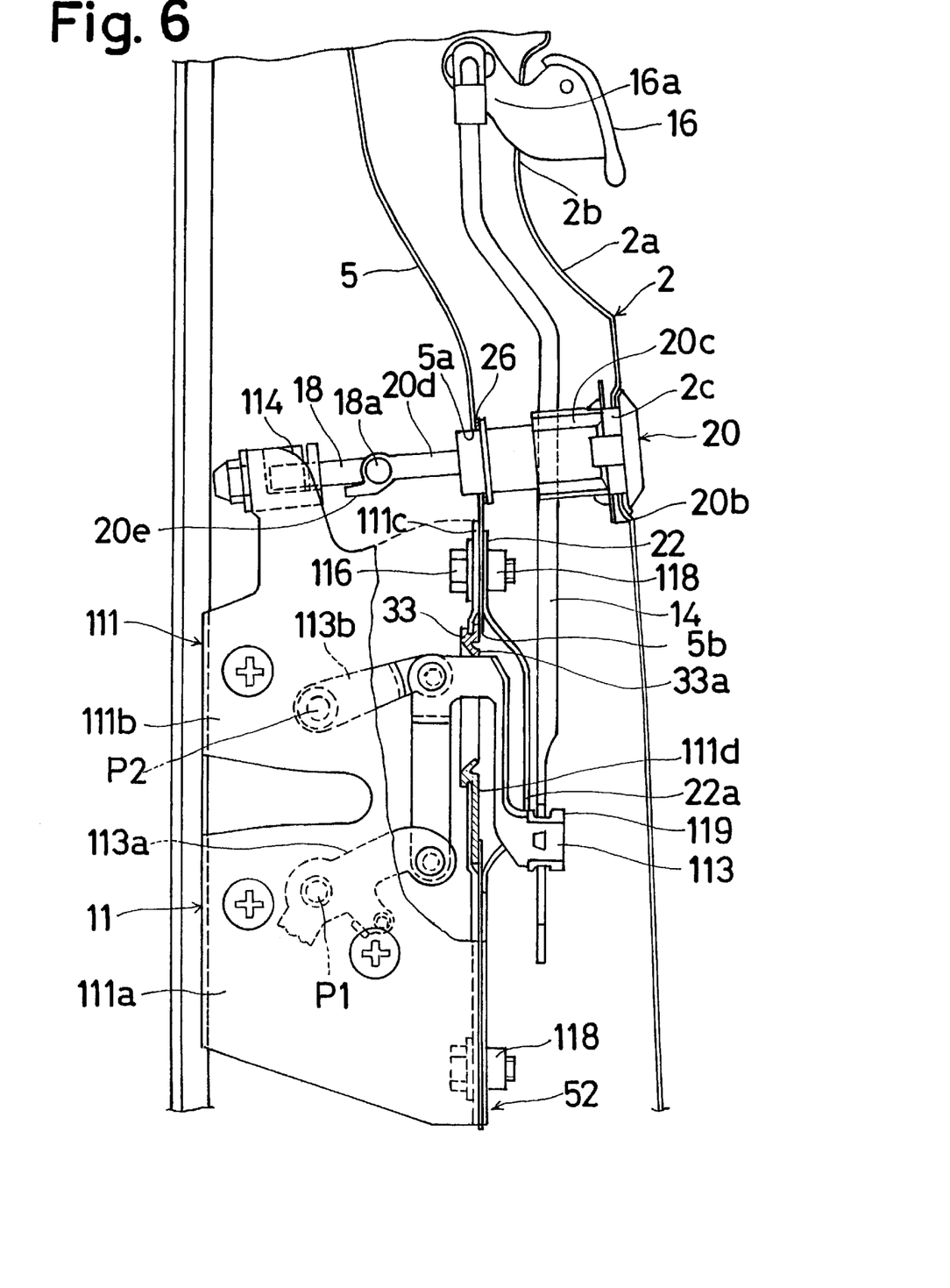
FIG. 6 is a cross-sectional view taken along the line B—B of FIG. 5.

The door lock device 11 is supported on the base plate 111, and a lever mechanism 113 is rotatable with respect to the door lock device 11 (see FIG. 6). The mechanism 113 is connected to the latch structure 12 and includes a main lever 113a. Upon rotation of the main lever 113a, which is supported by the base plate 111, the door latch structure 112 of the door lock device is disengaged from the striker of the vehicle body 12 and the vehicle door 1 can be opened with respect to the vehicle body 12. A key lever 114 (FIG. 5) of the door lock device 11 is rotatably supported on the base plate 111 and disengages the connection between the open lever 113 and the latch structure 112 via a locking lever (not shown) and the vehicle door 1 assumes a locked condition.

The door lock device 11 is accommodated on the inner side (i.e., passenger compartment side) of the panel 52 in the recess 525 of the panel 52, with the vertical wall 111a of the base plate 111 arranged in parallel with the second wall 522 of the lock side panel 52 (FIG. 7). The pair of flange walls 111b, 111c of the base plate 111 are secured to the walls 521, 524 of the lock side panel 52 from the inside of the compartment by respective fastening bolts 115, 116 and nuts 117, 118 to thereby attach the door lock device 11 on the inner surface of the door inner panel 5.

Since the door lock device 11 is secured to the inside surfaces of the walls 521, 524 of the lock side panel 52, the attachment of the door lock device into the vehicle door 1 becomes very easy and improves the efficiency of the door-assembling operation. Further, the bolts 115, 116 securing the door lock device 11 can receive a tensile load in cooperation with the door lock device itself when the load is applied to the door when the door is being opened. This is because the vehicle door 1 is in engagement with the vehicle body 12 through the door lock device 11.

It is further noted that the portions of the panel 52 fastened by the bolt 115 and nut 117 are reinforced by the base panel 6 which is welded to the center pillar portion 72 of the outer side of the door frame 7. Further, the portions of the panel 52 fastened by the bolt 116 and nut 118 are reinforced by a plate type of reinforcement 22 which is welded to the center pillar portion 72 of the outer side of the door frame 7. This will improve the strength of the attachment of the door lock device 11 to the vehicle door.

In accordance with the invention, this lock reinforcement 22 also functions as a hood to perform a water-proofing function to aid in preventing water from entering the inner side of the door inner panel 5, as will be explained. This water-proofing function is thus achieved by a relatively light-weight plate-like structure 22.

As shown in FIG. 6, the main lever 113a of the door lock device 11 is operatively connected to the door outside handle 16 and is rotatably supported on the door outer panel 2 through a door-opening lever 113 (details of which will be described later). The key lever 114 and a connecting element in the form of a rod 14 are operatively connected to a door key cylinder 20 which is attached to the door outer panel 2 through another connecting rod 18.

Figure 8:
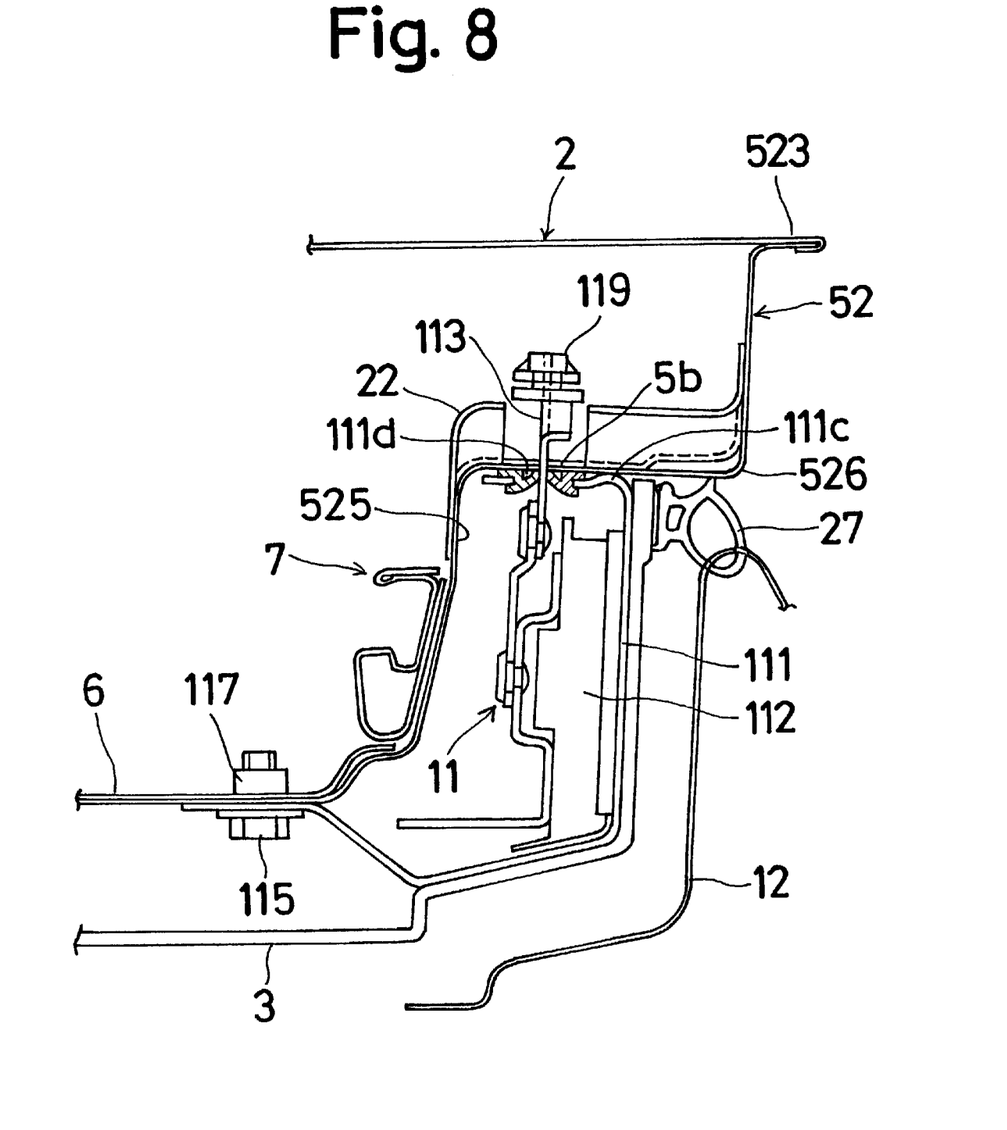
FIG. 8 is a cross-sectional view taken along the line D—D of FIG. 5.

As shown in FIGS. 6 and 8, the door outside handle 16 is disposed in a recess 2a formed in the outer surface of the door outer panel 2 and is rotatably supported on the door outer panel 2. A connecting arm portion 16a of the door outside handle 16 is inserted through an opening 2b formed in the door outer panel 2 and is positioned in the door outer space A between the door outer panel 2 and the door inner panel 5.

As shown in FIG. 6, through-holes 5a, 5b are formed in the lock side panel 52 of the door inner panel 5. The through-hole 5a is positioned above the through-hole 5b.

The lever 113 is of approximately reverse U-shaped as shown in FIG. 6 and extends through the through-hole 5b of the door inner panel 5 and through an elongated hole 111d provided in a flange wall 111c in horizontal alignment with the through-hole 5b. An inside lower end portion of the reverse U extends along the lock side panel 52 of the door inner panel 113a and is rotatably supported on the main lever 113a of the door lock device 11. An upper end portion of the reverse U shape of the open lever 113 is connected to a sub lever 113b which is rotatably supported on the door lock device 11 for performing an opening operation. Under such constructions, the main lever 113a is rotatable about a fulcrum P1, and the sub lever 113b is rotatable about a fulcrum P2, which enables the upward and downward movements of the lever 113 with respect to the vehicle door 1 (upward and downward as shown in FIG. 6).

The elongated hole 111d of the base plate 111 is slightly larger than the operational range of the door-opening lever 113, and the entire periphery of the elongated hole 111d is provided with a grommet 33 having a lip portion 33a extending outwardly, i.e., away from, the vehicle compartment, to prevent water or other exterior materials from entering the door lock device 11 which is located to the inside of the door inner panel 5. The lip portion 33a of the grommet is always in contact with the upper portion of the lever 113 when the door outside handle 16 is in a rest position (the condition shown in FIG. 6) and prevents water from entering into the inner space B. An outside lower end of the lever 113 (disposed remote from the passenger compartment side) is inserted through a through-hole 22a provided in an approximately central portion of the hood 22 and extends along an outer surface of the hood 22. Thus, that outside lower end of the lever 113 is located in the door outer space A formed between the door outer panel 2 and door inner panel 5. Further, a connecting grip 119 is fitted into the outer lower end of the lever 113 and is located at the outer side of the panel 5. Thus the hood 22, situated to the outside of the panel 5, covers the entire portion of the through-hole 5b of the door inner panel 5 and the projecting portion of the lever 113. The through-hole 5b of the door inner panel 5 is positioned higher than the through-hole 22a of the lock reinforcement 22.

It should be noted that the through-hole 22a, instead of being provided in the lock reinforcement 22 could be provided in another element provided separately from the lock reinforcement 22 and secured thereto. Such a separately provided element could cover the through-hole 5b of the door inner panel 5 and the projecting portion of the open lever 113 disposed on the outer side of the through-hole 5b.

Figure 4:
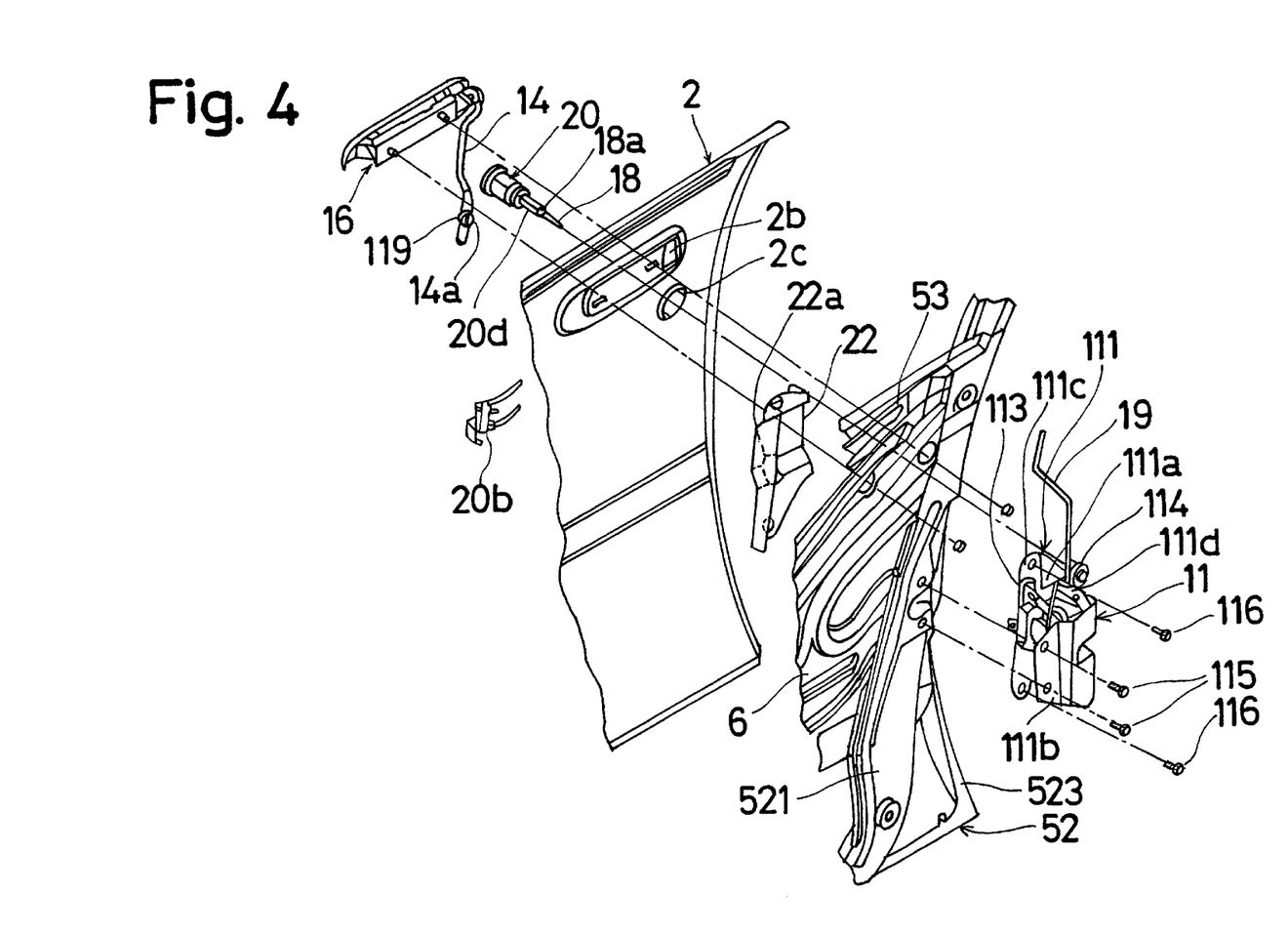
FIG. 4 is an exploded perspective view of the door lock device upon attachment to the vehicle door according to the present invention.

The connecting rod 14 is disposed in the door outer space A between the door outer panel 2 and door inner panel 5 and one end thereof is clipped to the arm portion 16a of the outside door handle 16 and the other end of the connecting rod 14 is clipped by a connecting clip 119 to the lever 113 through the elongated hole 14a provided at the lower end of the connecting rod 14. (See FIGS. 4 and 6).

Upon rotation of the door outside handle 16 in the counter clockwise direction as viewed in FIG. 6, the connecting rod 14 is moved downward to thereby move the lever 113 downward. These downward movements of the connecting rod 14 and the lever 113 cause a rotation of the lever 113a of the door lock device 11 to open the vehicle door 1.

Thus, according to the structure of this invention, by a simple construction, the linear movement of the connecting rod 14 is converted to rotational movement of the lever 113 of the door lock device.

The key cylinder 20 is inserted into the through-hole 2c provided on the door outer panel 2 and further inserted through the through-hole 5a of the door inner panel 5 after traversing the door outer space A. The key cylinder 20 is supported on a cylinder case 20c by a supporting clip 20b secured to the door outer panel 2. The key cylinder 20 is thus supported at respective ends by the door outer panel 2 and the door inner panel 5 to assure the stability of the attachment of the key cylinder 20 to the vehicle door assembly.

A connecting rod 18 (FIG. 9) extending from the key cylinder 20 is disposed to the inside of the door inner panel 5 and is rotatably connected to a key rotary rod 20d by a pin 18a at one end in the inner side of the door inner panel 5. The other end of the connecting rod 18 is secured to the key lever 114.

Figure 9:
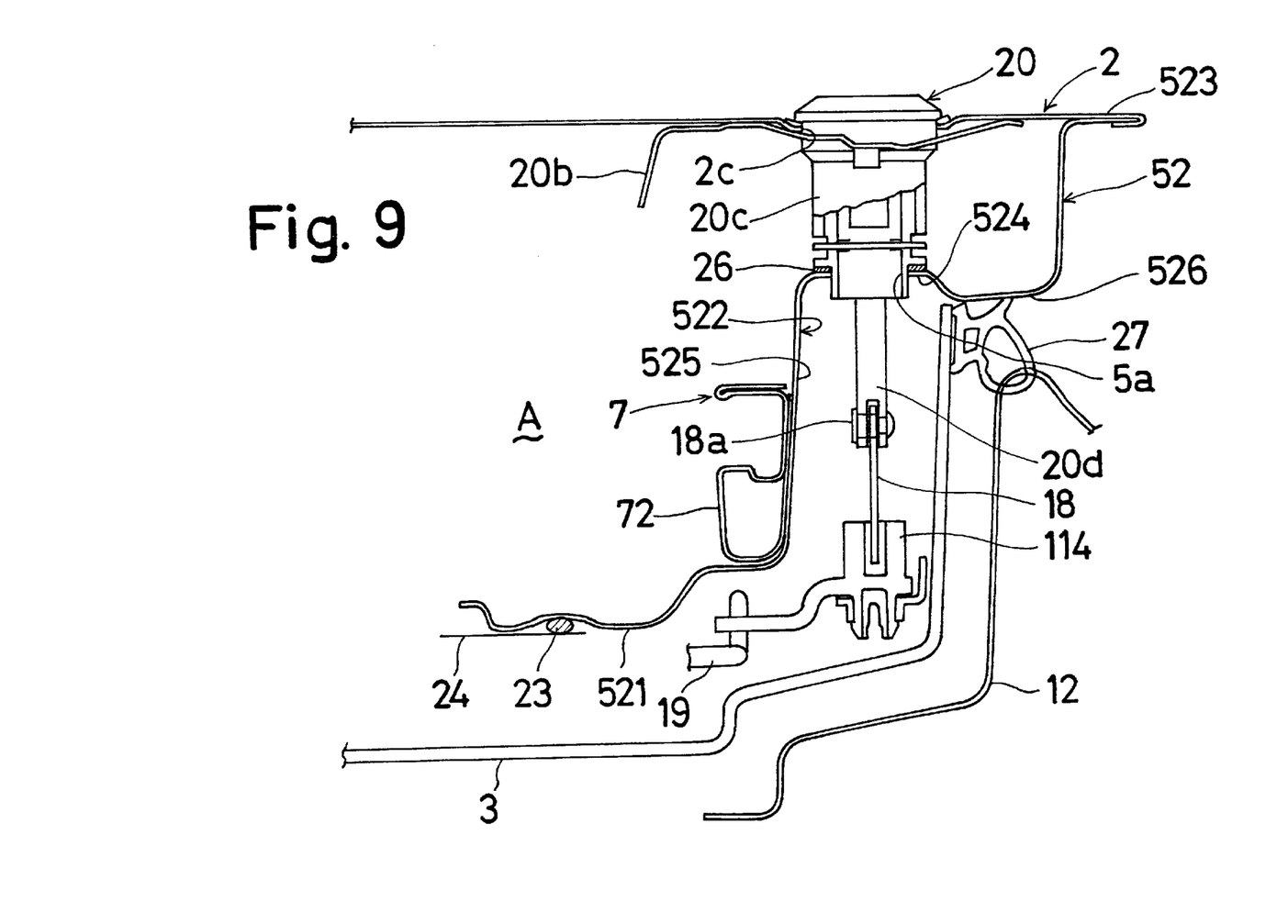
FIG. 9 is a cross-sectional view taken along the line E—E of FIG. 5.

The key rotary rod 20d is rotatably connected to the connecting rod 18 and rotational movement of both rods 20d and 18 may absorb the eccentricity of the relative movement thereof. A pawl 20e is provided on the key rotary rod 20d to restrict an excess rotation of both rods 20d and 18.

The key lever 114 is rotatably supported on a bracket secured to the vertical wall 111a of the base plate 111 and coaxial with the key rotary rod 20d. The key lever 114 is connected to a locking lever through a locking rod 19 (FIG. 9). Upon rotation of the door key cylinder 20, the connecting rod 18 is rotated, and the key lever 114 of the door lock device 11 is rotated to lock the door 1 with respect to the vehicle body.

The through-hole 5a of the door inner panel 5 into which the door key cylinder 20 is inserted is overlapped with a flange portion 20f provided at about the center of the key cylinder 20. A sealing ring 26 is compressed between the flange portion and the panel 5 to perform a sealing function between the outer and inner spaces A and B.

Now referring to the assembly process of the structure of the invention, a first step is, as shown in FIG. 2, involves forming a door module 4 and at the same time welding the reinforcement hood 22 thereto to secure the two together.

After the welding, the door outside handle 16 (which has been connected to the connecting rod 14), and the door key cylinder 20 (which has been connected to the connecting rod 18) are attached to the outside of the outer door panel 2. The grommet 33 is inserted into the through-hole 111d of the base plate 111, and the door lock device 11 is attached to the inner side of the door inner panel 5. Upon the attachment of the door lock device 11 to door inner panel 5, the connecting clip 119 of the connecting rod 14 is inserted into the open lever 113 of the door lock device 11, and the door outside handle 16 is operatively connected with the open lever 113 via connecting rod 14. The connecting rod 18 is inserted into the key lever 114 of the door lock device 11, and the door key cylinder 20 is operatively connected with the key lever 114 via the connecting rod 18.

Thus, the engagement between the door outside handle 16 and the door key cylinder 20 of the door lock device 11 is carried out by the fitting insertion and attaching process of the door lock device to the vehicle door. That process is simple and fast compared with that of the conventional process.

The lever 113 of the door lock device 11 is connected to the inside lever 120 which is rotatably supported by the flange wall 111b of the base plate 111. The inside lever 120 is connected to the door inside handle 17 provide on the door trim 3 through the connecting rod 15 disposed on the inner side of the door inner panel 5. (See FIG. 1). The lever 113 is rotatable upon the operation of the door inside handle 17.

The key lever 114 is connected to a lock knob 21 provided on the door trim 3 through a connecting rod 19 provided to the inside of the door inner panel 5, and the key lever 114 can be rotated upon the operation of the lock knob 21.

Further, the door lock device 11 is covered by the door trim 3 and is disposed between the door trim 2 and door inner panel 5. The door lock device 11 is thus concealed inside of the door 1 so as not to be seen from the inside of the compartment of the vehicle. The connecting rods 18 and 19, both connected to the key lever 114 of the door lock device 11 for opening and closing the door, are disposed between the door trim and the door inner panel 5. Accordingly, the door outer space A in which the door window glass is to be accommodated contains no components which function for the locking and opening operation of the door 1. Under this structure, if a thief tries to open the door by inserting tools into the space A along the window glass from the outside of the vehicle door, he or she cannot unlock the door lock device.

This structure of the invention thus also serves as a vehicle theft prevention.

The door trim 3 is screwed to the peripheral portion of the door inner panel 5. The end portion of the door trim 3 corresponding to the lock side panel 52 side of the door inner panel 5 is disposed along the wall 522. However, the recess 525 of the wall 522, in which the door lock device 11 is located, is recessed. Accordingly, the door lock device 11 is disposed along the base plate 111, and further a flange 31 is provided on the door trim 3, and the door trim 3 is attached to the flange portion 31 of the vertical wall 111a of the base plate 111 thereof by screws 32. Thus, the door trim 3 is screwed to the base plate 111 of the door lock device 11, which may prevent any possible deformation and interference with the vehicle body.

Figure 10:
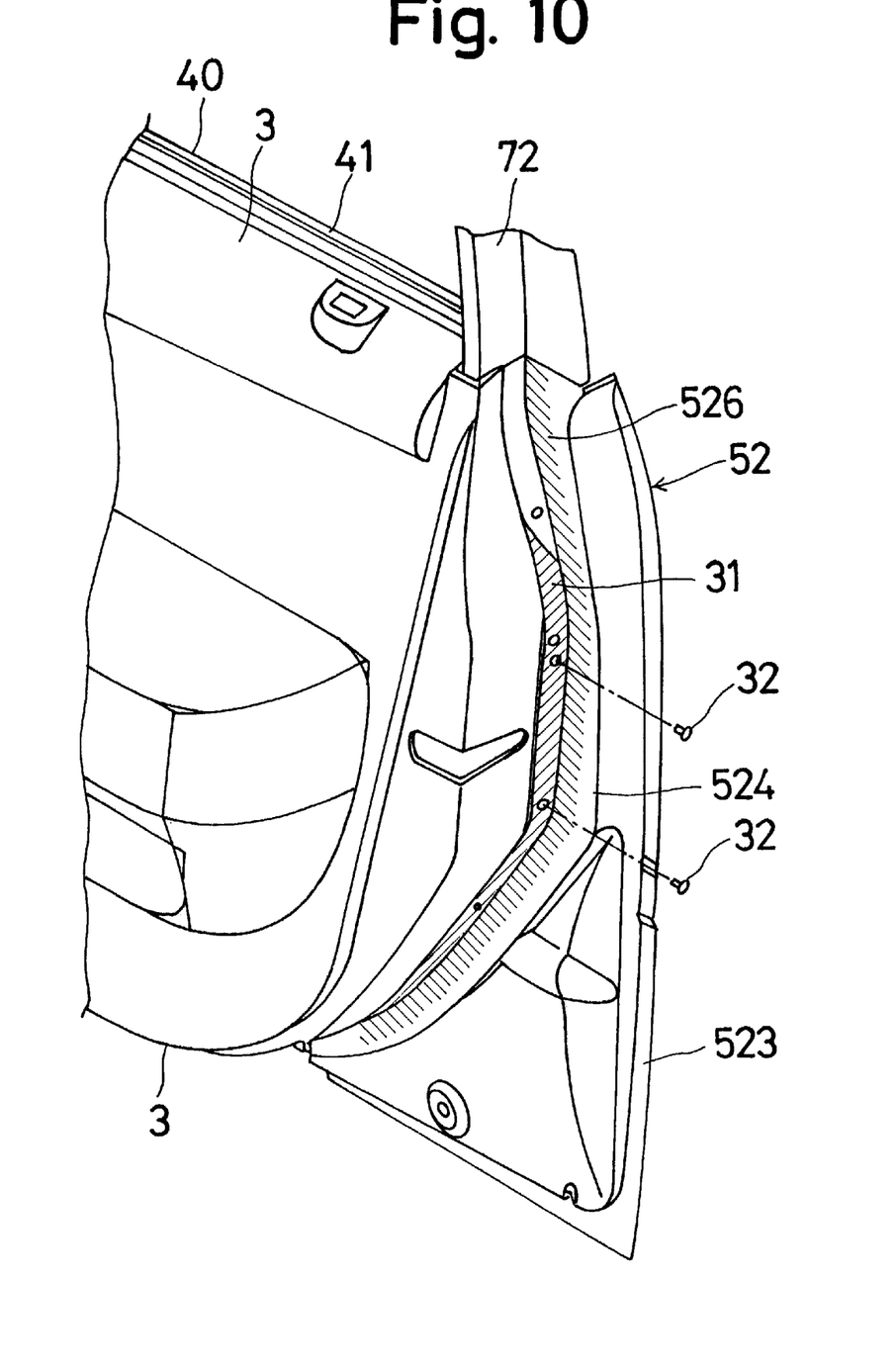
FIG. 10 is a perspective view of the weather strip attached to the vehicle door of the present invention.

A weather strip 27 is attached between the vehicle door 1 and vehicle body 12 along the front, lower, and upper edges of the door inner panel 5. The door inner panel 5 has a sealing surface which is in parallel with the door outer panel 2 and is opposing the vehicle body 12. The lock side panel 52 has a sealing surface 526 which continues from the flange wall 524 provided on the wall 522. The weather strip 27 is in contact with these sealing surfaces for sealing between the vehicle door 1 and vehicle body 12. The weather strip 27 is secured to the wall 522 of the lock side panel 52 at the door inner panel 5 side, and is secured to the flange portion 31 of the door trim 3 at the portion where the door lock device 11 is accommodated.

According to the present invention, since the through-holes 5b, 111d are covered by the hood element 22, water or other external substances that may enter the outer space A are prevented from entering the inner space B and from contacting the seal 33. Thus, by this structure the door lock device can be protected from the rain or water to improve the reliability of the door lock function. Also, the seal is protected from being corroded.

The element 113 of the door lock device has a reverse U-shaped, one end of which is extended into the outer space A along the hood element 22 and connected to the connecting element 14, and the other end of which is disposed in the inner space B. A main lever is rotatably connected to the other end of the element 113 for actuating the door lock device. One end of a sub lever 113b is rotatably connected between the convex portion and the other end of the lever 113, and the other end is rotatably connected to a base plate of the door lock device, whereby the linear movement of the connecting element upon opening operation of the door outside handle may be converted into the rotational movement and such rotational movement is transmitted to the door lock device.

According to the present invention, a water proof seal material may be preferably provided on the outer peripheral portion of the through-hole to enhance the water proofing function.

According to another preferred aspect of the invention, the hood element may constitute a reinforcement to reinforce the portion of the door inner panel corresponding to the attachment portion of the door lock device.

According to the above-described vehicle door system, since the door lock device is disposed to the inner side of the door inner panel, the vehicle theft prevention function will be improved.

It is intended that the foregoing detailed description be regarded as illustrative rather than limiting and that it is understood that the following claims including all equivalents are intended to define the scope of the invention.

What is claimed is:

1. A vehicle door system including a door, a door lock device, and a door outside handle;

the door comprising a door inner panel and a door outer panel interconnected to form an outer space therebetween, the inner panel including a through-hole extending from the outer space situated on an outer side of the inner panel to an inner space situated on an inner side of the inner panel;

the door lock device disposed in the inner space and being operable to open and close the door;

the door outside handle attached to the outer panel;

a door-opening lever connected to the door lock device and extending through the through-hole;

a linearly movable connecting element disposed in the outer space and interconnecting the door outside handle with the door opening lever for transmitting movement from the door outside handle to the door-opening lever; and a hood secured to the inner panel for reinforcing the inner panel and overlying the through-hole for opposing the travel of moisture to the through-hole.

2. The vehicle door system according to claim 1, wherein the door-opening lever has a U-shape profile whereby a first end portion of the door-opening lever extends in the outer space, and a second end portion of the door-opening lever extends in the inner space, the connecting element connected to the first end portion, the door lock including:

a main lever rotatably connected to the second end portion of the door-opening lever for actuation of the door lock device, and a sub lever one end of which is rotatably connected to the second end portion of the door-opening lever at a location spaced from the connection between the main lever and the door-opening lever, and another end of which is rotatably connected to a base plate of the door lock device, and wherein linear movement of the connecting element in response to an opening operation of the handle is converted into rotational movement of the door-opening lever to be transmitted to the door lock device.

3. The vehicle door system according to claim 2, wherein the through-hole is provided with a water proofing seal element extending around the entire periphery thereof.

4. The vehicle door system according to claim 3 wherein the hood element is formed of a stiff material and is arranged to reinforce a portion of the door inner panel at a location where the door lock device is attached.

5. The vehicle door system according to claim 2, wherein the hood is formed of a stiff material and is arranged to reinforce a portion of the door inner panel at a location where the door lock device is attached.

* * * * *